June 26, 1962    PIERRE-JEAN RICARD    3,041,264

BOILING WATER ATOMIC REACTOR

Filed Aug. 5, 1959

United States Patent Office 3,041,264
Patented June 26, 1962

---

3,041,264
BOILING WATER ATOMIC REACTOR
Pierre-Jean Ricard, Paris, France, assignor to Commissariat a l'Energie Atomique, Paris, France
Filed Aug. 5, 1959, Ser. No. 831,811
Claims priority, application France Aug. 14, 1958
4 Claims. (Cl. 204—193.2)

The present invention relates to a barrier cylinder for controlling the evacuation of water and the suppression of level which causes natural circulation in a boiling water atomic reactor.

The invention applies particularly to an atomic reactor of the type comprising a plurality of active cells disposed vertically side by side, each cell being extended by a cylindrical stack which is surmounted by a water and vapour separating cyclone. The vapour escapes at the top of the cyclone, and the water flows into a reflector provided in the tank of the reactor around the group of cells.

The invention has for its object to provide a water level in the central part of the reactor which is higher than that in the peripheral reflector, so as to increase the protection of the upper portions of the tank. A further object of the invention is in the case of a reactor mounted on board a ship, to eliminate as far as possible the height causing natural circulation in the water circuit so as to minimize the influence of the inclination of the ship and of the vertical accelerations upon the inlet and outlet flow rates of the water circulating through the reactor under the action of pumps. The invention seeks to reduce turbulence of the water caused by roll of the ship. The invention is also useful where the reactor may be subjected to similar movements without being mounted on board a ship.

In accordance with the invention, a cylinder is disposed around the stacks and constitutes a barrier between the water evacuated by the cyclones and the water of the reflector, the cylinder being provided with openings which control the rate of discharge into the reflector. The cylinder maintains in the peripheral reflector, where the intakes of the circulation pumps are located, a sufficiently low level to eliminate natural circulation in the water circuit so that the rate of circulation of the water does not undergo fluctuations when an inclination or a vertical acceleration of the reactor takes place. At the same time, a body of water is maintained above the core of the reactor of sufficient thickness to ensure efficient protection of the space situated above the tank.

The accompanying drawing shows schematically, by way of example, an illustrative embodiment of construction and installation of a barrier cylinder according to the invention which will be described hereinafter.

Figure 1:
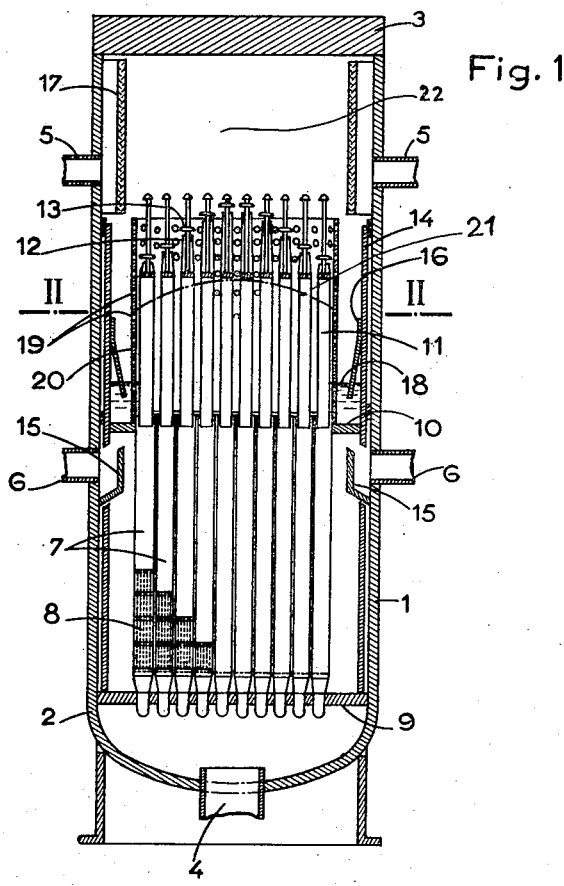
Figure 2:
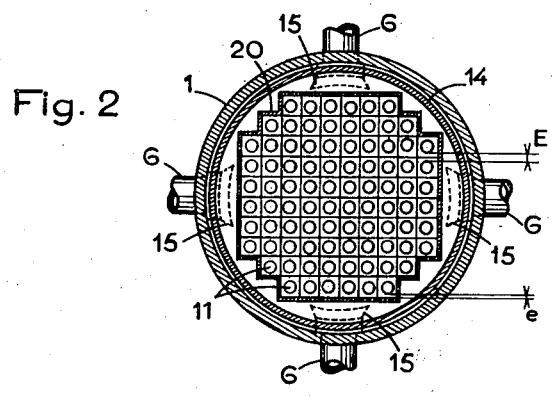

In the drawing:
FIG. 1 is an axial section of the reactor.
FIG. 2 is a cross section on line II—II of FIGURE 1.

The boiling water reactor consists essentially of a tank 1 of circular cross section, provided with a bottom 2 and a lid 3; water is forced into the tank 1 through a conduit 4 by pumps (not shown). At its upper portion the tank 1 is provided with vapour outlets 5 and water outlets 6 are provided substantially at the central portion of tank 1.

Inside tank 1 the reactor cells are disposed vertically in parallel rows, each consisting of a sheath 7 of square cross section inside which are stacked groups of fuel bars 8. The assembly of sheaths 7 is supported by a grate 9 and is retained at its upper part by a grate 10. Above grate 10 sheaths 7 extend into stacks 11, each of which is surmounted by a water and vapour separating cyclone 12 and a water deflector 13. An annular thermal shield 14 is disposed around the group of cells near the wall of tank 1.

In front of each of the water outlets 6 is disposed a deflector 15 and another deflector 16 is secured against the thermal shield 14; a louvred shield 17 is disposed in front of each of the vapour outlets 5 to separate the droplets of water carried along by the vapour.

FIGURE 2 shows the location of the group of cells in the tank 1; the deflector 16 has been omitted from the figure for the sake of clarity. Stacks 11 are separated from each other by spaces E.

A body of water surrounding the group of cells above the lower grate 9 constitutes a reflector whose upper level 18 is situated above the water outlets 6 at a height sufficient to cover said outlets even when the reflector tilts from the vertical at a predetermined angle.

During the operation of the reactor the water droplets separated from the vapour by cyclones 12 and deflectors 13 fall between the stacks 11 and flow through the spaces E towards the periphery of the group of stacks.

In accordance with the invention this flow is controlled by openings 19 in a barrier cylinder screen constituted by a prismatic casing 20 consisting of vertical partitions supported by the upper grate 10 and surrounding the group of stacks 11, intervals E being provided between the partitions and the peripheral stacks 11.

Due to the barrier cylinder 20, the water evacuated by the separator cyclones 12 is maintained at the periphery of the group of stacks at a level higher than the level 18 in the reflector; due to the effect of successive discharges of water inside the barrier cylinder through the narrow spaces E separating the stacks, the level of water decreases gradually from the centre of the group of stacks towards the periphery thereof. Curve 21 shown in dotted lines in FIGURE 1 shows the level variation in the interior of the barrier cylinder 20.

It is therefore possible to regulate the level in the reflector so that the weight of the water inside the cells is the same as that of the water in the external return circuit, thus eliminating natural circulation while maintaining a sufficiently high level of water above the core to provide efficient protection of the space above the tank.

Furthermore, the presence of barrier cylinder 20 has the advantage of reducing agitation of the water as compared to a free level occupying all the section of the tank 1. Openings 19 in the barrier cylinder 20 are more numerous or of larger section when the height of the barrier is increased. This arrangement is designed to reduce to the fluctuations of level in the interior of the barrier cylinder 20 and in the reflector when the ship rolls or when vertical acceleration varies. This results in reduction of the influence of the movements of the ship on the external circulation circuit of the water.

When the ship rolls and in case the location and section of the orifices 19 is even throughout the height of the barrier cylinder 20, an elevation of the mean level of water is obtained for a given rate of flow of water through inlet 4 and outlets 6, calculated parallel to the axis of the reactor, in the interior of the barrier cylinder, and the mean level in the reflector is lowered. By making the number or the flow sections of openings 19 suitably progressive with respect to their level, for a given flow rate of water in 4 and 6 a decrease of the mean level of water is obtained in the interior of the barrier cylinder, calculated parallel to the axis of the reactor, and consequently elevation of the mean level in the reflector. Laws of flow may therefore be worked out for said openings as a function of their level, such that the two above-mentioned effects compensate each other sufficiently to keep the mean level of water in the reflector substantially constant, thus keeping the natural circulation height at zero, in such a way that the flow rate of water circulation is not disturbed when the inclination of the ship varies.

As far as vertical accelerations are concerned, the progressivity of number or flow section of openings 19 in barrier cylinder 20 reduces the difference of levels over those which would result from evenly disposed openings.

Finally, it may be noted that during flow of the water at relatively low speed through spaces E separating the stacks, and during flow into the reflector, bubbles of vapour, which may have formed in the space between the stacks, may be released into the vapour chamber 22 after passing between the stacks 11. Inclined deflector 16 prevents turbulence and movement of bubbles, caused by flow of the water from the barrier cylinder 20 into the reflector.

The embodiments of the invention in which an exclusive property or privilege is claimed are defined as follows:

1. In a water cooled nuclear reactor, a tank, a plurality of sheaths disposed axially in said tank, fuel bars in said sheaths, a lower grate in said tank supporting said sheaths, a cooling water inlet in said tank below said lower grate, an upper grate in said tank supporting the upper ends of said sheaths, water outlets in said tank beneath said upper grate, a stack extending from the upper end of each of said sheaths, means on each of said stacks for downward discharge of drops of cooling water, vapor outlets in said tank above said means, a thermal shield in said tank spaced therefrom and surrounding said stacks and in fluid tight engagement with said upper grate, a perforate screen spaced from and within said shield surrounding said stacks and supported on said upper grate whereby a compartment is provided between said shield, said screen and said upper grate to receive cooling water, the flow of cooling water from around said stacks through said screen to the compartment being retarded by said screen thereby maintaining a higher water level around said stacks than in the compartment.

2. A nuclear reactor as described in claim 1 in which said perforate screen has an effective open area increasing from the bottom to the top of said screen.

3. A nuclear reactor as described in claim 1 in which said screen is a prismatic casing open at its top.

4. A nuclear reactor as described in claim 1 in which said means are cyclone separators and deflectors.

References Cited in the file of this patent
UNITED STATES PATENTS 2,857,324     De Boisblanc  ---------- Oct. 21, 1958

FOREIGN PATENTS 215,410     Australian  -------------- June 4, 1958

OTHER REFERENCES

Proceedings of the Second International Conference on the Peaceful Uses of Atomic Energy, Geneva, Sept. 1–13, 1958, vol. 8, pages 143–159.